April 21, 1964
S. WASSERMAN
3,129,881
ROTARY SLIDE RULE
Filed April 22, 1963
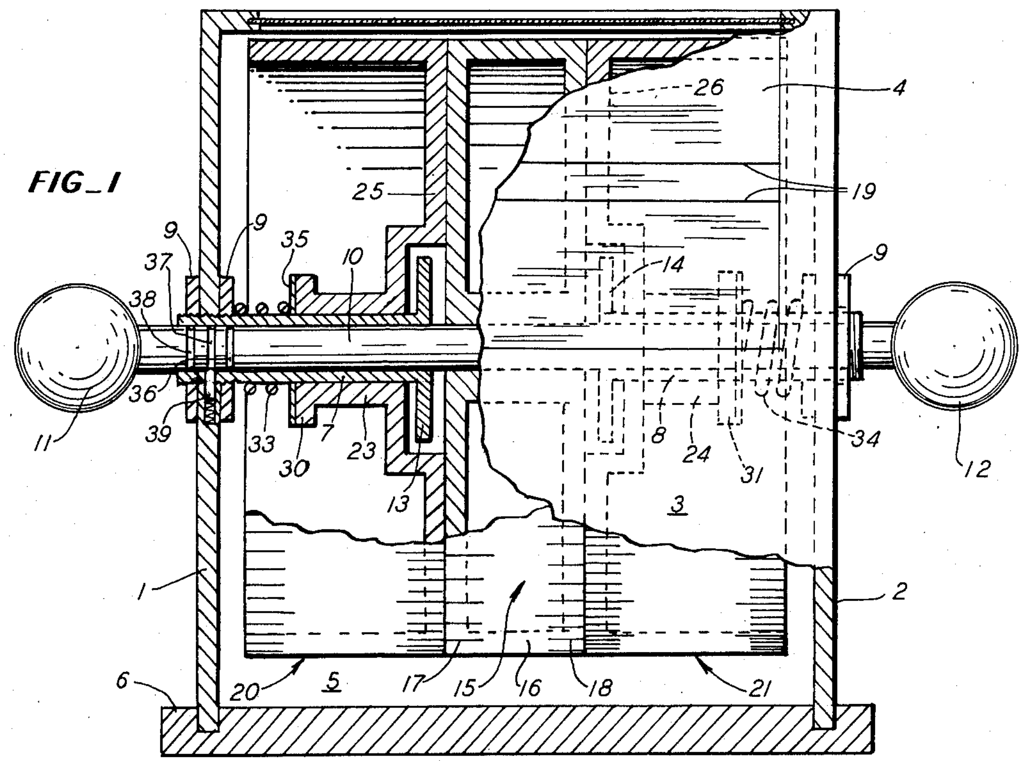
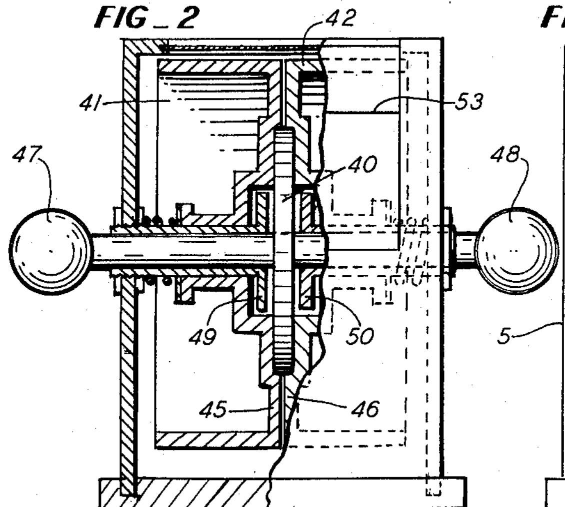
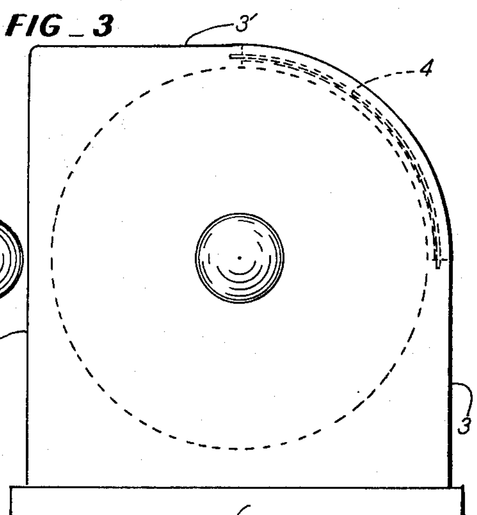
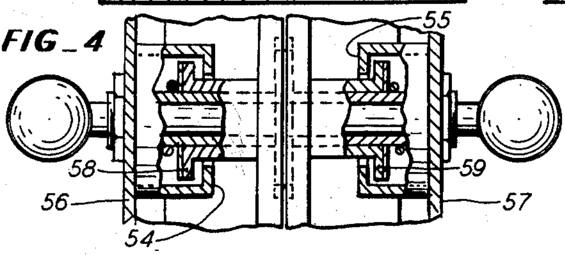
INVENTOR.
SAMUEL WASSERMAN
BY
Boyken, Mohler + Foster
ATTORNEYS United States Patent Office 3,129,881

Patented Apr. 21, 1964

3,129,881

ROTARY SLIDE RULE

Samuel Wasserman, 291 Alta Loma Ave., Daly City, Calif.

Filed Apr. 22, 1963, Ser. No. 274,669
7 Claims. (Cl. 235—79.5)

This invention relates to a rotary slide rule or computer, and has for one of its objects the provision of a rotary slide rule in which all settings may be made by manipulation of a rule actuating member by one hand of the operator without removing the hand from such member.

Another object of the invention is the provision of a rotary slide rule having a similar rule actuating member at opposite sides of the rule, either of which members is adapted to be manually actuatable for making any desired setting of the rules without removing the hand from the actuating member that is selected for making the settings.

A still further object of the invention is the provision of a rotary slide rule having a plurality of adjacent pairs of rules that may be actuated by manipulation of a single rule actuating member by one hand of the operator for making any desired setting of all of the rules or any adjacent pair thereof from one side of the slide rule and without removing the hand from said members.

An added object of the invention is the provision of a rotary slide rule having a plurality of adjacent pairs of rules that are actuatable for making any desired setting of one or more of said pairs by manual manipulation of either one of a pair of rule actuating members, and the members of which pair are at opposite sides of the slide rule.

A further object of the invention is the provision of a rotary slide rule of simple, rugged, economical construction, and one that is adapted to provide for making a greater number of computations than heretofore, and which rule is adapted to be manually actuated from either side thereof without removing the actuating hand from the part actuated thereby.

Another object of the invention is the provision of a rotary computing device or rotary slide rule, having a pair of axially aligned drums or cylinders provided with graduations on their outer peripheries adapted to be aligned relative to each other and to a reading line for making the desired computation, and which slide rule includes means for selectively rotating either drum individually without disturbing the other, or for rotating both drums as a unit, as desired.

Other objects and advantages will appear in the description and drawings.

In the drawings, FIG. 1 is a part cross sectional, part elevational view of one form of the invention as seen from the front.

FIG. 2 is a reduced size part elevational part sectional view of a slightly different form of the invention.

FIG. 3 is an end elevational view of the slide rule or computer of FIG. 1 as seen from one end of the slide rule of FIG. 1. It should be noted that the view in FIG. 3 is the same for an end view of FIG. 2.

FIG. 4 is a fragmentary part elevational and part cross sectional view of a modification that is applicable to either FIGS. 1 or 2.

In detail, referring to FIG. 1, the slide rule comprises a housing having corresponding vertical endwalls 1, 2, a front and top wall 3 and 3′ having a curved transparent section 4 (FIGS. 1 and 3) that is convex as viewed from the front, and a vertical rear wall 5. A horizontal bottom wall 6 provides a base for supporting the computer on a table.

The words "front," "rear" and words of similar connotation are used with reference to the side of the device from which readings may be taken, which is the "front" side. Thus the sections 3, 4 are at the front side.

It is to be understood that the invention is not intended to be restrictive as to the contour or shape of the housing, as it may have different shapes. However in the shape illustrated in the drawings, the transparent section 4 follows the cylindrical contour of the rules or drums, and is close to the outer peripheral surfaces of the latter, as will later be explained more in detail, which enables an operator at the front side of the housing to quickly and accurately manipulate and to make the desired settings and to obtain accurate readings.

A pair of coaxial, horizontally disposed open-ended tubular bearing elements 7, 8 are respectively secured at one of their ends in coaxial openings formed in endwalls 1, 2, and said bearing elements extend into said housing toward each other from said endwalls to spaced relation at their adjacent ends. The end of each element that is secured in the opening formed in each endwall is preferably exteriorly threaded and a pair of nuts 9 threadedly supported on the end of each bearing element tightly clamp the adjacent endwall between each pair of nuts to support said elements in coaxial alignment on said endwalls, and stationary relative to said endwalls.

A central shaft 10 is rotatably fitted within and extends through said bearing elements 7, 8. This shaft is also reciprocable longitudinally thereof within said bearing elements and projects at its opposite ends outwardly of the pair of endwalls 1, 2. Said projecting ends have manually graspable knobs 11, 12 secured rigidly thereon in positions preferably equally spaced from the walls 1, 2 for a purpose that will be described in more detail later on.

The terminating inner or adjacent ends of the bearing elements 7, 8 are respectively formed or provided with radially outwardly projecting vertical annular flanges 13, 14. These flanges are in spaced opposed relation, and equally spaced between them is a central circular member 15 that is rigid on shaft 10 for movement as a unit therewith and that projects radially outwardly of said shaft 10. Said member 15 has oppositely outwardly facing flat surfaces that are in spaced opposed relation to the vertical flanges 13, 14, and which surfaces are adapted to engage either flange 13 or flange 14 upon axial movement of the shaft 10 to the left or to the right, as desired, and limits the axial movement of shaft 10.

In the form of the invention as seen in FIG. 1 the member 15 is a drum having a cylindrical outer peripheral wall 16 on which may be inscribed one or more annular rows of graduations. Two such rows are indicated at 17, 18, said rows being adjacent to opposite sides of the drum. Obviously the drum 15 may be of any desired width and have any number of rows of graduations or other markings thereon, according to the requirements of the rule.

The present invention is not intended to be restricted to any particular graduations, indicia, or symbols, since these may vary according to the computations to be made. The transparent upper section 4 may have one or more reading lines 19 with which the graduations on the drums within the housing are adapted to register, as will later appear. Two reading lines 19 are shown in FIG. 1. As noted, one may be adequate for certain uses of the rule, but any desired number may be used.

At opposite sides of, and coaxial with member 15, is a pair of similar, cylindrical drums 20, 21 having central horizontal internal hubs 23, 24 that rotatably and slidably support said drums 20, 21 on the bearing elements 7, 8.

The drums 20, 21 have adjacent side walls 25, 26 that have opposed surfaces adapted to frictionally engage the oppositely outwardly facing surfaces of the member 15 from the outer peripheries of the drums and member 15 to the central portions of said drums. The central portions of the walls 25, 26 are recessed to receive the flanges 13, 14, with the bottoms and sides of said recesses spaced equally from said flanges so that the flanges are free from engagement with the member 15 and with drums 20, 21. The sides of drums 20, 21 opposite to walls 25, 26 thereof are open and these open sides are adjacent to endwalls 1, 2 of the housing.

The hubs 23, 24 are respectively formed with radially outwardly projecting annular flanges 30, 31 on their terminating ends, which ends are adjacent to, but equally spaced from, the endwalls 1, 2. Helical springs 33, 34 react between the inner nuts 9 at the inner side of each endwall and the terminating ends of hubs 23, 24 to yieldably hold the walls 25, 26 of drums 20, 21 against the opposite sides of the central drum or member 15. If desired, a washer 35 may be positioned between each of the springs 33, 34 and the end of the hub engaged thereby to act as a thrust bearing between each spring and each hub.

From the foregoing, it will be seen that springs 33, 34 function to yieldably hold drums 20, 21 against member 15 and to also hold the central members 15 out of engagement with the flanges 13, 14, with the knobs 11, 12 equally spaced from the endwalls 1, 2. It should be noted, however, that it is not necessarily essential to the operation that knobs 11, 12 be equally spaced from walls 1, 2.

A set of axially spaced outwardly opening grooves 36, 37, 38 may be formed in one end portion of shaft 10, and a conventional spring urged detent 39, carried by the endwall of the housing adjacent thereto, such as wall 1 in FIG. 1, is adapted to be yieldably urged into the central groove 37 to yieldably hold the shaft in its central position as seen in FIG. 1 but the detent will automatically be moved out of groove 37 upon application of force axially applied on either of the knobs 11 or 12 toward or away from the housing for seating of the detent in groove 38 or 36 as the case may be.

In operation, assuming certain of the graduations on the three drums are to be aligned by use of the right hand, the operator will first grasp knob 12, as seen in FIG. 1, and will push the shaft 10 to the left. The central member 15 will immediately move drum 20 to the left and drum 21 will follow central member 15 until the bottom of the recess in wall 26 of drum 21 engages flange 14. A slight further movement of shaft 10 to the left will space drums 20, 15 from drum 21 and then the drums 20, 15 may be rotated as a unit, but drum 21 will be frictionally held by flange 14 against rotation. Shaft 10 is then rotated until the desired graduation on drum 20 is in register with the desired reading line 19. The detent 39 at this time will be in groove 36 and, if the knob 12 is released, the shaft 10 will be held stationary with drum 21 frictionally held against flange 14. Thus, said flange will function as a stop member both to prevent rotation of drum 21 upon rotation of shaft 10 and hold the drum 21 spaced from the drum 15.

The next step is to pull knob 12 to the right until the flange or stop member 13 will hold the drum 20 stationary and spaced from drum 15, and then the shaft 10 is rotated to register the desired graduation on drum 15 with the desired reading line 19 and in alignment with the previously aligned graduation on drum 20. Detent 39 will now be on groove 38.

The third step is to again move shaft 10 to the left until the drum 21 is held by the flange or stop member 14 and to then rotate the drums 20, 15 together as a unit until their aligned graduations are aligned with the desired graduation on drum 21. Then by moving the shaft axially to its central position, as seen in FIG. 1 and then rotating it in the desired direction, all three drums may be rotated as a unit so their aligned graduations will register with the desired reading line. Should any of the desired graduations on any of the drums be located out of the range of the window or section 4, it is apparent that by the manual manipulation of either knob 11, 12 they may all be readily brought into range for alignment.

All of the above steps may be accomplished by manual manipulation of either knob 11, 12, and without removing the hand from the knob selected.

The only difference between this form of invention shown in FIG. 2 and that of FIG. 1 is that the central member 40 in FIG. 2 takes the place of drum 15 and does not extend to the outer periphery of the pair of drums 41, 42 (FIG. 2) that are at opposite sides of the member 40. The drums 41, 42 may be the same structure as drums 20, 21. In other words, the rotary computer of FIG. 2 has only two drums instead of three, and the adjacent walls 45, 46 of drums 41, 42 are slightly spaced apart by the member 40.

In the operation of the computer of FIG. 2, to effect a computation, one of the knobs 47, 48, which knobs correspond to knobs 11, 12, is grasped and is pushed or pulled axially to free one of the drums for rotation while the other drum is held stationary by one of the flanges or stop members 49, 50, which correspond to flanges 13, 14. Then the shaft is rotated until the graduation on this rotating drum is in alignment with the reading line 53. A reverse movement of the shaft to the opposite end of its axial movement will hold the registered drum stationary and will permit rotation of the other drum to the point where the desired graduation thereon is in register with the reading line. Then when the shaft is centered again, the drums will engage member 40 for further rotation together as a unit therewith and the desired computation may be made.

It is obvious that with the computer of FIG. 1 it may be designed so that different computations may be made with the actuation of any of the pairs of drums as well as computations requiring actuation of all three.

FIG. 4 illustrates a modification in which stop members 54, 55 are rigid with the endwalls 56, 57 of the rule housing. These stop members 54, 55 perform the same function as flanges 13, 14 of FIG. 1, and flanges 49, 50 of FIG. 2 in limiting the axial movement of the drum. However, in this instance the stop members engage the axially inwardly directed surfaces of flanges 58, 59 which correspond in shape to flanges 30, 31 on hubs 23, 24 of FIG. 1. Thus the flanges 58, 59 of FIG. 4 perform the same function as the bottom of the recesses in drum walls 25, 26 of FIG. 1.

The invention is not to be limited by the exact embodiment of the device shown, which is merely by way of illustration and not limitation, as various other forms of the device will be apparent to those skilled in the art without departing from the spirit of the invention or the scope of the claims.

I claim:

1. A rotary slide rule comprising:

(*a*) a shaft supported for rotation about its longitudinal axis and for reciprocable movement axially thereof;

(*b*) means so supporting said shaft;

(*c*) a pair of drums coaxial with said shaft having marks on the outer peripheries thereof adapted to be positioned in alignment upon rotation of said drums relatively about said axis;

(*d*) drum engaging means rigid with said shaft between said drums;

(*e*) means supporting said drums for rotation about said axis independently of each other and together and for reciprocable movement longitudinally of said axis relative to each other;

(*f*) a pair of yieldable means respectively engaging each of said drums yieldably urging said drums into frictional driving engagement with said drum engaging means for rotation of said drums with said shaft upon rotating said shaft;

(*g*) manually graspable means rigid with said shaft accessible for grasping by a hand of the operator for manually moving said shaft axially thereof in one direction for thereby moving said drum engaging means and one drum of said pair as a unit in the direction of movement of said shaft against the yieldable resistance of one of said yieldable means;

(*h*) drum holding means stationary relative to the other drum of said pair, and (*i*) stop means on said other drum movable into engagement with said holding means upon said movement of said one drum in said one direction for spacing said other drum from said drum engaging means and for holding said other drum stationary whereby said one drum may be rotated relative to said one drum upon rotation of said shaft.

(*j*) one of said yieldable means being adapted to yieldably move said other drum out of engagement with said stop means and to move said drum engaging means into engagement with said other drum upon release of said manually graspable means and shaft.

2. In a rotary slide rule as defined in claim 1:

(*k*) the other yieldable means of said pair of yieldable means being adapted for so moving said other drum into engagement with said drum holding means upon movement of said shaft in said one direction.

3. In a rotary slide rule as defined in claim 2:

(*l*) said shaft being movable in an opposite direction relative to said one direction, (*m*) a second drum holding means stationary relative to said one drum of said pair;

(*n*) a stop means on said one drum movable into engagement with said second drum holding means under the influence of said first mentioned yieldable means upon movement of said shaft in said opposite direction for spacing said one drum from said drum engaging means and for holding said one drum stationary whereby said other drum may be rotated relative to said one drum upon rotation of said shaft.

4. In a rotary slide rule as defined in claim 2:

(*l*) said drum engaging means being a third drum having marks on the outer periphery thereof adapted to be positioned in alignment with the marks on said pair of drums, respectively, upon rotation of said third drum relative to said pair of drums.

5. A rotary slide rule comprising:

(*a*) a pair of coaxial drums having graduations on their outer peripheries adapted to be moved into alignment upon relative rotation of said drums;

(*b*) a pair of coaxial, stationary, hollow bearing elements supporting said drums for rotation thereon and also for axial movement relative thereto;

(*c*) a shaft coaxial with said bearing elements supported thereby for rotation and for reciprocation axially thereof;

(*d*) a member rigid with said shaft between said drums adapted to move one drum of said pair axially on its bearing element supporting said one drum in a direction away from the other drum of said pair upon axial movement of said shaft in said one direction;

(*e*) yieldable means yieldably urging said drums toward each other and into engagement with said member;

(*f*) stationary stop means rigid against axial movement of said shaft;

(*g*) means rigid with said other drum movable under the influence of the yieldable means for moving said other drum toward said one drum into engagement with said stationary stop means upon movement of said shaft in said one direction for holding said other drum against movement with said one drum in said one direction, whereby said one drum will be spaced from said member upon said last mentioned movement of said shaft for rotation of said one drum independently of said other drum upon said rotation of said shaft.

6. A rotary slide rule as defined in claim 5:

(*h*) a housing enclosing said drums;

(*i*) said stationary means being rigidly connected with said housing;

(*j*) said stop means being an annular portion of said other drum coaxial with said shaft.

7. A rotary slide rule comprising:

(*a*) a pair of coaxial drums having graduations on their outer peripheries adapted to be moved into alignment upon relative rotation of said drums;

(*b*) a pair of coaxial, stationary, hollow bearing elements supporting said drums for rotation thereon and for axial movement relative thereto in opposite directions;

(*c*) means supporting said elements stationary and spaced apart;

(*d*) a shaft coaxial with said elements supported thereby for rotation and for reciprocation axially thereof;

(*e*) a member rigid with said shaft positioned between said drums;

(*f*) a pair of yieldable means in operative engagement with said pair of drums respectively, yieldably urging said drums toward each other and into into frictional engagement with said member whereby rotation of said shaft will effect rotation of said drums;

(*g*) a pair of stop means respectively adjacent to each drum and stationary relative to said bearing elements;

(*h*) a pair of separate rigid means rigid with each drum of said pair;

(*i*) means supporting said pair of stop means in positions for engaging the said rigid means on the trailing drum of said pair upon movement of said shaft in one direction or the other for holding said trailing drum against axial movement thereof with the leading drum under the influence of said member whereby said drums will be separated to enable rotation of said leading drum relative to said trailing drum upon rotation of said shaft.

References Cited in the file of this patent

UNITED STATES PATENTS

| | | |
|---|---|---|
| 995,466 | Jones | June 20, 1911 |
| 1,459,279 | Butcher | June 19, 1923 |
| 2,299,698 | Halperin | Oct. 20, 1942 |